United States Patent [19]

Motegi

[11] Patent Number: 5,430,892
[45] Date of Patent: Jul. 4, 1995

[54] RECEIVER HAVING AN INDIVIDUAL SELECTIVE CALL FUNCTION AND A SECURITY FUNCTION FOR PREVENTING UNAUTHORIZED USE OF THE RECEIVER

[75] Inventor: Takamasa Motegi, Kawasaki, Japan

[73] Assignee: Matsushita Electric Industrial Co., Ltd., Osaka, Japan

[21] Appl. No.: 181,450

[22] Filed: Jan. 14, 1994

Related U.S. Application Data

[63] Continuation of Ser. No. 873,007, Apr. 24, 1992, abandoned.

[30] Foreign Application Priority Data

May 21, 1991 [JP] Japan .................................. 3-116109
Aug. 8, 1991 [JP] Japan .................................. 3-199124

[51] Int. Cl.⁶ .............................................. H04B 1/16
[52] U.S. Cl. ....................... 455/186.1; 455/38.2; 455/89; 340/311.1; 340/825.44
[58] Field of Search .................. 455/38.1, 68, 88, 89, 455/186.1, 345, 38.2, 183.1, 183.2, 344; 379/57, 62; 340/311.1, 825.44, 825.31, 825.34, 825.5, 542

[56] References Cited

U.S. PATENT DOCUMENTS

| | | | |
|---|---|---|---|
| 4,378,551 | 3/1983 | Drapac . | |
| 4,612,419 | 9/1986 | Smith | 379/396 |
| 5,021,776 | 6/1991 | Anderson et al. | 340/825.34 |
| 5,043,721 | 8/1991 | May | 340/311.1 |
| 5,068,889 | 11/1991 | Yamashita | 379/62 |
| 5,073,767 | 12/1991 | Holmes et al. | 340/825.44 |
| 5,146,217 | 9/1992 | Holmes et al. | 340/825.44 |
| 5,151,694 | 9/1992 | Yamasaki | 340/825.44 |
| 5,177,478 | 1/1993 | Wagai et al. | 340/825.44 |
| 5,257,412 | 10/1993 | Tomioka et al. | 455/89 |

FOREIGN PATENT DOCUMENTS

| | | | |
|---|---|---|---|
| 0224535 | 9/1988 | Japan | 455/38.1 |
| 0299416 | 12/1988 | Japan | 379/62 |
| 0188035 | 7/1990 | Japan | 455/38.1 |
| 2206926 | 8/1990 | Japan . | |
| 0187631 | 8/1991 | Japan | 455/38.1 |
| 2252692 | 8/1992 | United Kingdom | 340/825.44 |

*Primary Examiner*—Reinhard J. Eisenzopf
*Assistant Examiner*—Nguyen Vo
*Attorney, Agent, or Firm*—Stevens, Davis, Miller & Mosher

[57] ABSTRACT

A receiver with an individual selective call function includes a ROM for storing an individual selection number in which a secret number of the receiver is registered. A data control unit compares a secret number registered in its own memory and the secret number registered in the individual selection number ROM of the receiver, and when they are not equal, the read-/write operation of the individual selection number ROM is disabled.

7 Claims, 6 Drawing Sheets

RECEIVER HAVING AN INDIVIDUAL SELECTIVE CALL FUNCTION AND A SECURITY FUNCTION FOR PREVENTING UNAUTHORIZED USE OF THE RECEIVER

This application is a continuation of application Ser. No. 07/873,007, filed Apr. 24, 1992 (abandoned).

BACKGROUND OF THE INVENTION

The present invention relates to a receiver with an individual selection function for use in a mobile communication apparatus, and more particularly to the addition of a security function to prevent unauthorized use.

In a system for selecting a specified receiver by assigning a different identification number to each of a plurality of receivers and sending an identification number inherent to a receiver from a transmitter, manufacturers of such a system have been manufacturing and stock-managing individual oscillators, with a huge expense and manpower for local oscillations of the receivers, corresponding to the receiving frequencies assigned to the users (paging service companies). Recently, the receiving local oscillation frequency is generated by a synthesizer. (This system is hereafter referred to as a synthe-pager).

The synthe-pager uses an EE ROM for the data of the local oscillation frequency and an individual call number as an individual selection number ROM (hereinafter referred to as an IDROM) and selects the selection number by a ROM writer (which may comprises a pager controller for accessing the IDROM and an interface). Thus, a receiving frequency desired by a user can be selected from a common oscillator.

However, if the prior art synthe-pager is stolen, other person may use it by rewriting the frequency data by the ROM writer of the synthe-pager. Because of a risk which the user may encounter when the synthe-pager is stolen, measure to prevent it have been desired.

SUMMARY OF THE INVENTION

It is a first object of the present invention to prevent unauthorized persons from using a ROM writer of a stolen synthe-pager to rewrite its frequency.

It is a second object of the present invention to write a common number to a synthe-pager when it is shipped from a plant in order to permit efficient test of products and later rewrite it to a secret number which a user registers, by a service company in order to attain higher security.

It is a third object of the present invention to provide a pager which facilitates the work of the second object in an efficient manner.

Other objects of the present invention will be specifically described in the detailed description of the invention.

In accordance with the present invention, when a secret number registered to a data controller does not match a secret number of a receiver with an individual selective call function, the data controller disables the read/write operations of a ROM of the receiver with the individual selective call function. In this manner, the unauthorized use by other user is prevented and the user may add a security function to the synthe-pager of his/her own.

When a secret number preset by the receiver with the individual selective call receiver is a common secret number, the secret number entered to the data controller is set into the ROM of the receiver with the individual selective call function. In this manner, the secret number of the data controller can be readily registered into the receiver with the individual selective call function.

DESCRIPTION OF THE PREFERRED EMBODIMENTS

Figure 1:
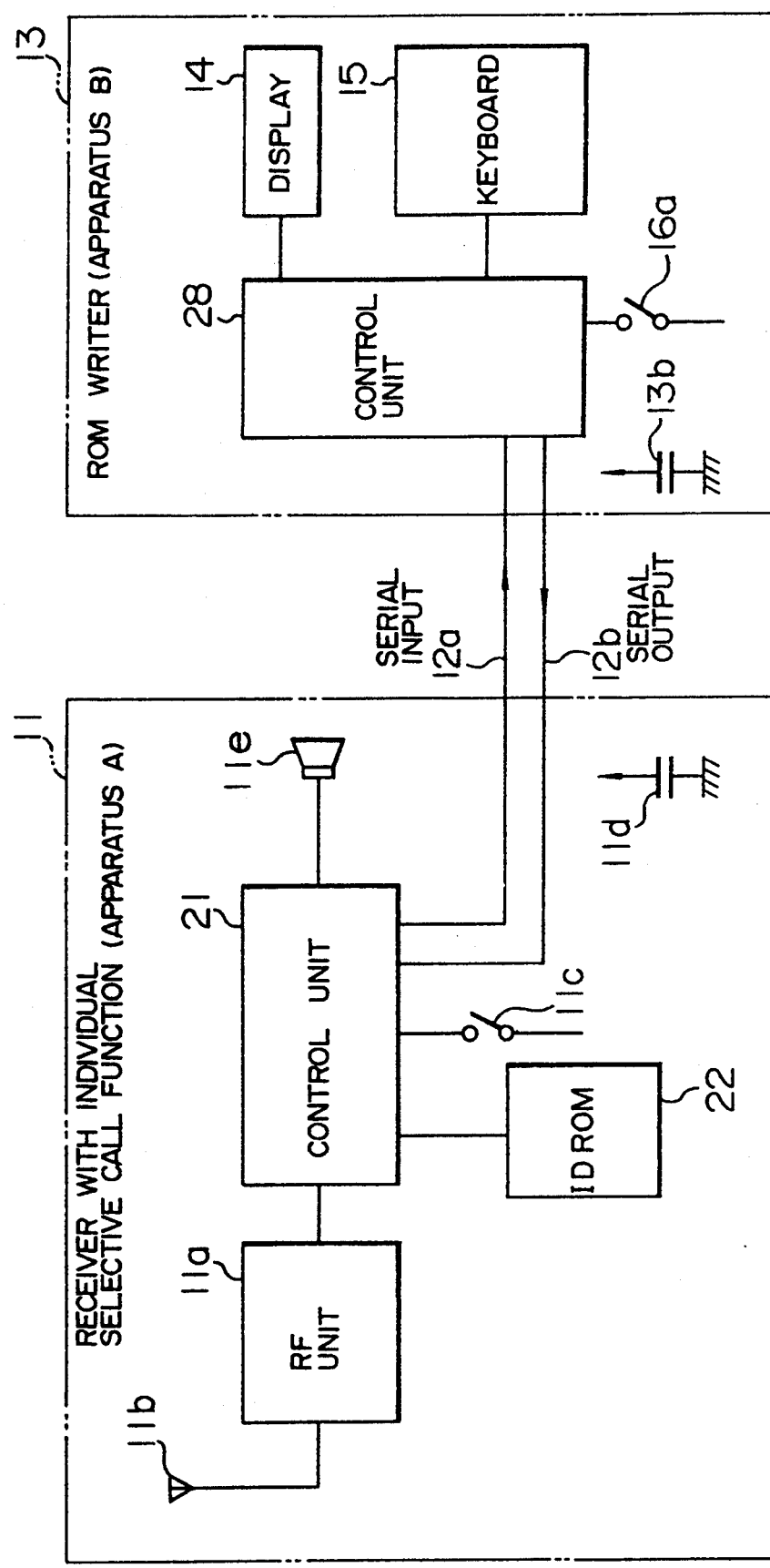
FIG. 1 shows a block diagram of a first embodiment of a receiver with an individual selective call function.
Figure 2:
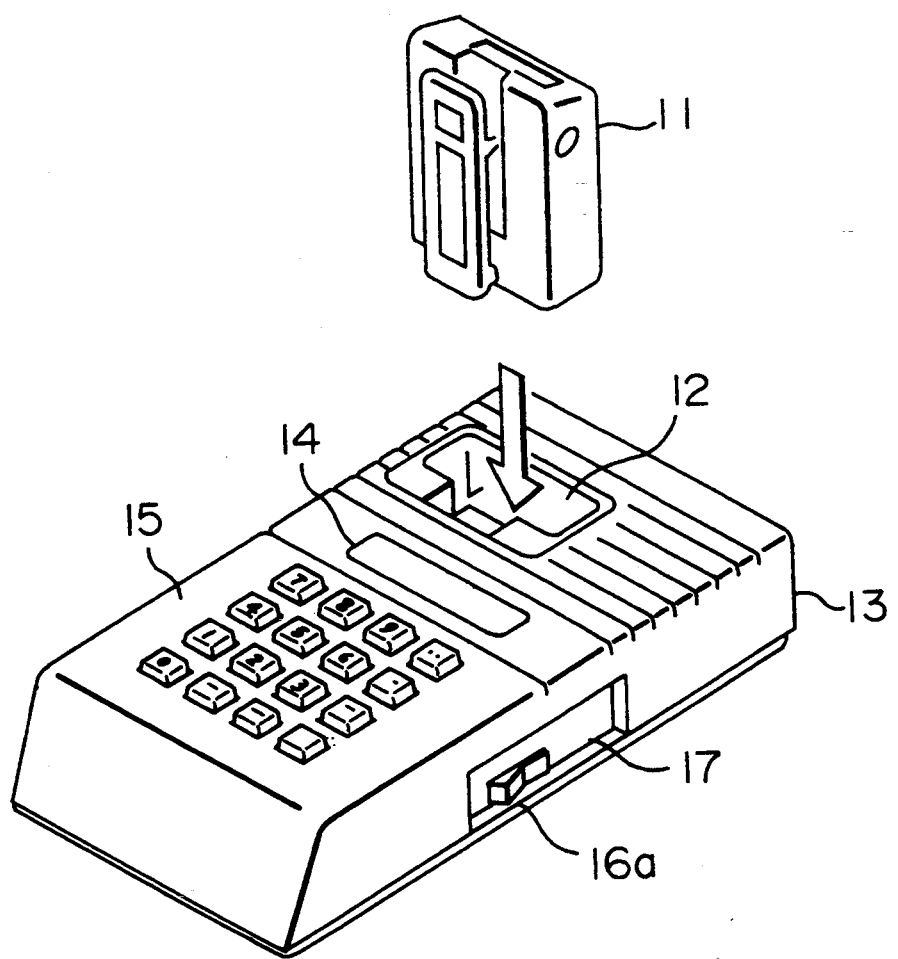
FIG. 2 shows an external perspective view of the receiver with the individual selective call function shown in FIG. 1.

FIG. 1 shows a block diagram of a configuration of a first embodiment of the present invention, and FIG. 2 shows an external perspective view thereof. In FIGS. 1 and 2, numeral 11 denotes a receiver with an individual selective call function (hereinafter referred to as an apparatus A) having a rewritable ROM. It receives a calling wave by an RF unit 11a and an antenna 11b, and a control unit 21 activates a sound generation unit 11e for information.

Numeral 11c denotes a power switch arranged in the apparatus A 11, numeral 11d denotes a power battery, and numeral 22 denotes an IDROM which is connected to the control unit 21. Numeral 12 in FIG. 2 denotes a ROM write port of the apparatus A 11, and numeral 17 denotes an external power input terminal of an apparatus B 13. Numeral 13 denotes a ROM writer which functions as a data control unit (hereinafter referred to as an apparatus B). Numeral 14 denotes a display of the apparatus B 13, numeral 15 denotes a keyboard which serves as manipulation means for entering a secret number of the apparatus B 13, numeral 16a denotes a power switch of the apparatus B 13, and numeral 13b denotes a power battery of the apparatus B 13.

Numeral 28 denotes a control unit of the apparatus B 113, and the power switch 16a, the keyboard 15 and the display 14 are connected to the control unit 28.

Numeral 12a denotes an input connecting line connected between the control unit 21 of the apparatus 11 and the control unit 28 of the apparatus B 13, and numeral 12b denotes an output connecting line connected between the control unit 21 of the apparatus A 11 and the control unit 28 of the apparatus B 13.

Figure 3:
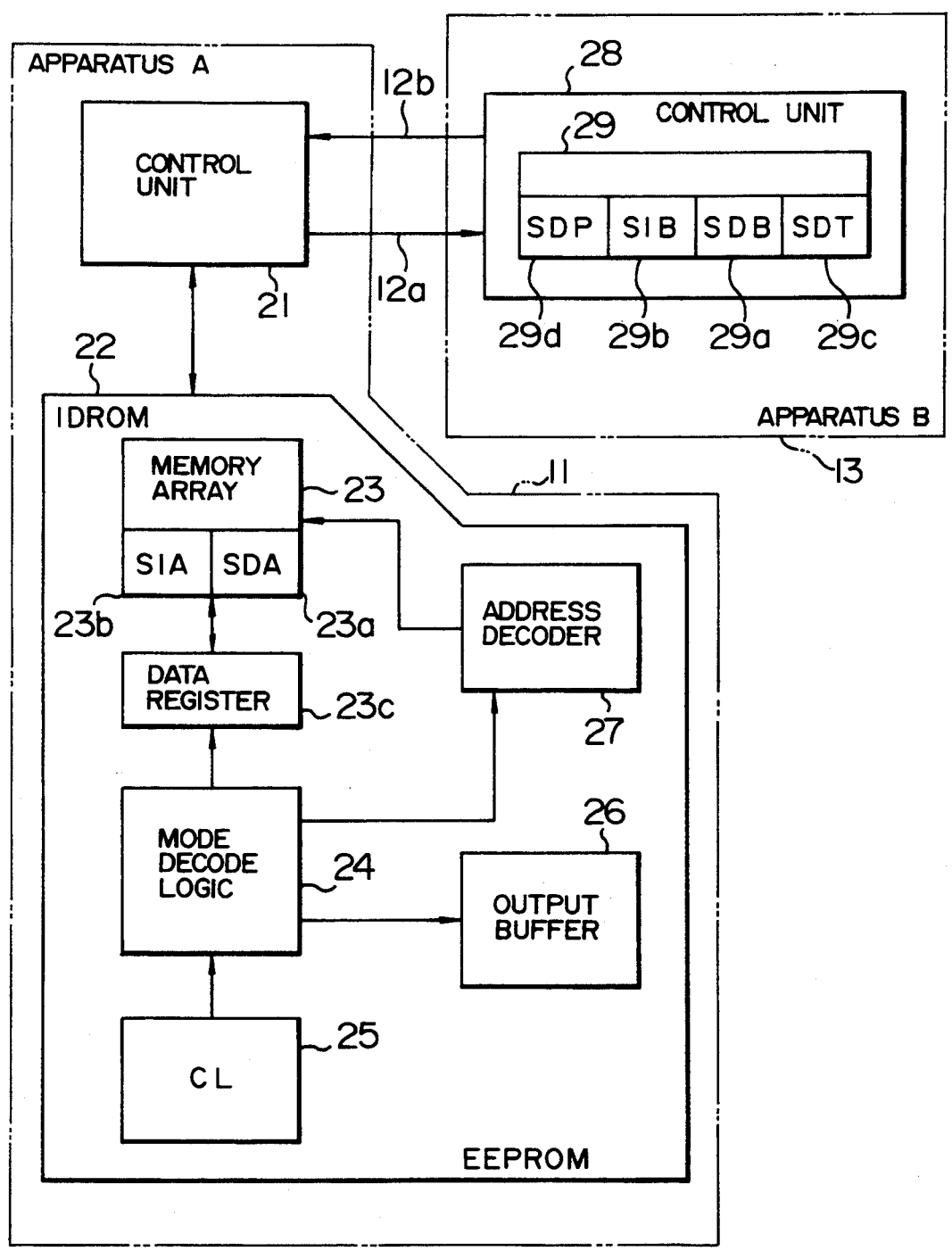
FIG. 3 shows a block diagram for illustrating control functions of a control unit and an IDROM in the receiver with the individual selective call function of FIG. 1.

FIG. 3 shows a block diagram of the present invention around the IDROM 22. In FIG. 3, numeral 23 in the IDROM 22 connected to the control unit 21 denotes a memory array, numeral 23a denotes a security code assigned to the apparatus, numeral 23b denotes anti-coincidence count data (which is initially "3") paired therewith, and numeral 23c denotes a data register. Data is exchanged between the data register 23c and the memory array 23.

Numeral 24 denotes a mode record logic which receives a clock from a clock generator 25, decodes a mode and stores it in an output buffer 26, and outputs it to a data register 23c and an address decoder 27. The address decoder 27 decodes an address of the memory 23 and designates an address of the memory 23. The IDROM 22 may be ISM16811 (manufactured by Oki).

Numeral 29 denotes a memory of the control unit 28. The memory 29 is temporary data memory which is under control of the control unit 28 and it may be a RAM (TC5564 manufactured by Toshiba). Numeral 29a denotes a portion (SDB) of data of the memory 29 and it is a security code assigned to the apparatus B 13. Numeral 29b denotes anti-coincidence count data (SIB) paired therewith, numeral 29c denotes a temporary buffer (SDT) for comparing the data (SDB), and numeral 29d denotes a common number (SDP) preset in a plant.

Figure 4:
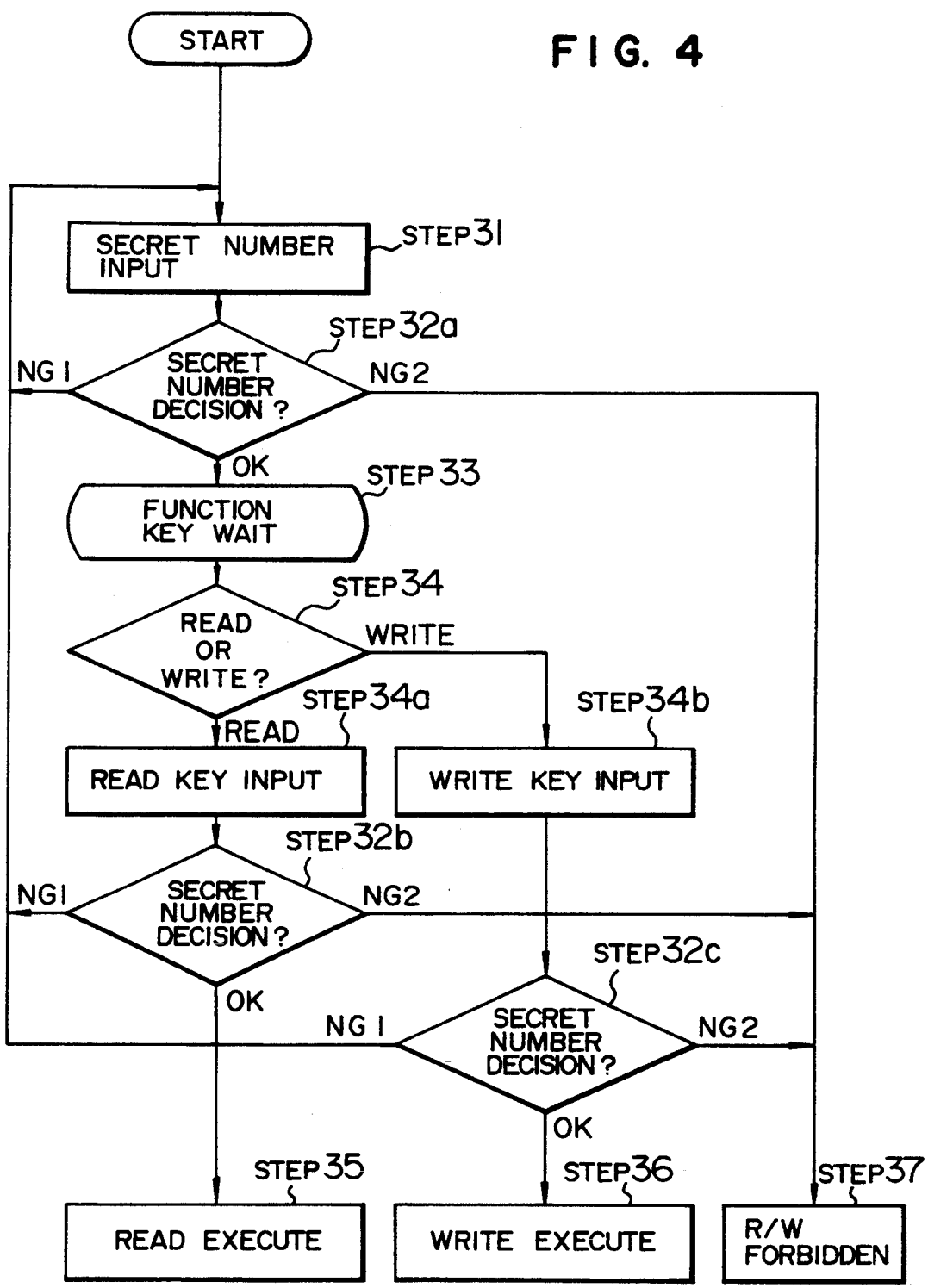
FIG. 4 shows a flow chart of a main routine of a control process of the receiver with the individual selective call function.
Figure 5:
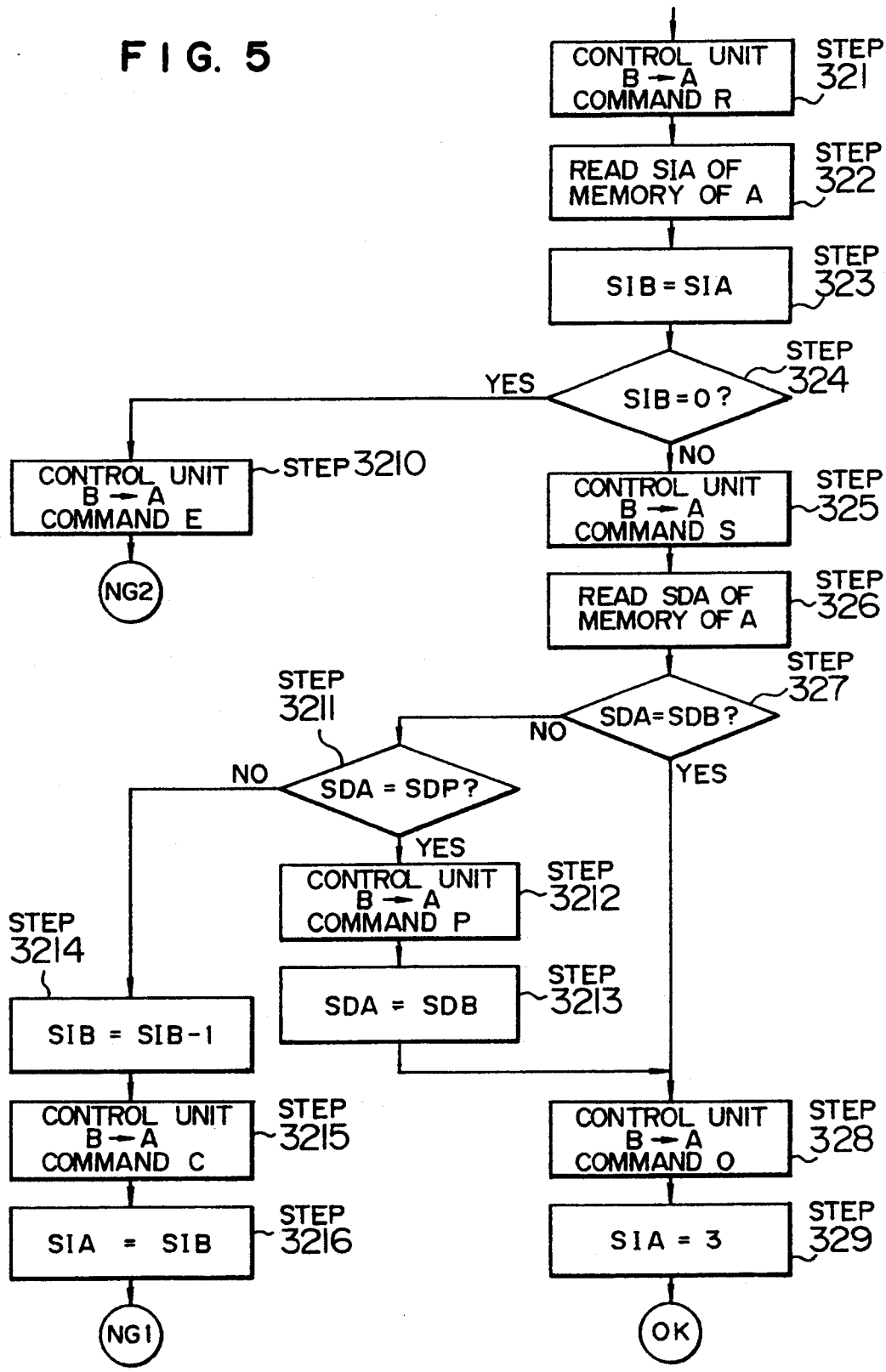
FIG. 5 shows a flow chart of a sub-routine of a decoding process in the flow chart of FIG. 4.

An operation of the first embodiment is now explained with reference to flow charts of FIGS. 4 and 5 in which FIG. 4 shows a main routine and FIG. 5 shows a sub-routine of a secret number decoding unit of FIG. 4.

The flow chart of the main routine of FIG. 4 is first explained. When the power switch 16a shown in FIGS. 1 and 2 are turned on, a message 14a as shown in FIG. 6 is displayed on the display 14 requesting a decision whether to enter a secret number or not.

When the negative (N) for the entry of the secret number is selected, the operation is not relevant to the present invention. Therefore, the explanation of the operation for the negative decision is omitted.

Figure 6:
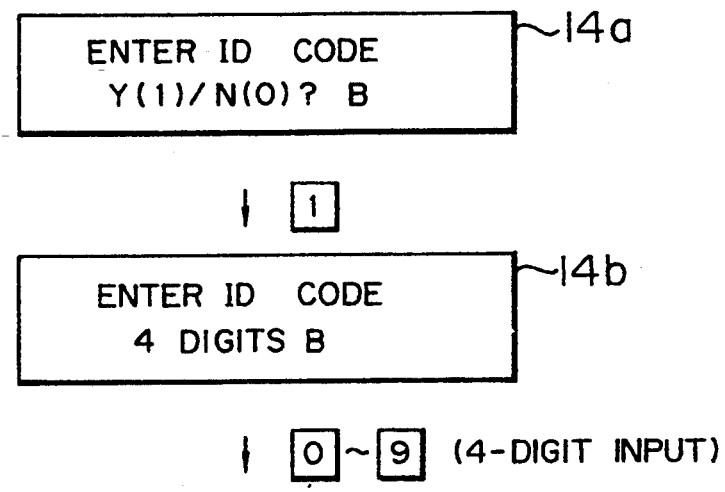
FIG. 6 illustrates data displayed on a display of the receiver with the individual selective call function of FIG. 2.

When the entry of the secret number is affirmed (Y), the screen message of the display 14 changes to a message 14b of FIG. 6, and the process waits for the entry of the secret number in a step 31.

When a secret number n (for example, 4 digits in decimal notation) is entered from the keyboard 15 of the apparatus B 13, the sub-routine of the secret number discrimination of FIG. 5 is executed for the secret number n in a step 32a of FIG. 4.

In a step 321, the control unit 28 of the apparatus B 13 sends a command R to the control unit 21 of the apparatus A 11 through the output connecting line 12b.

In a step 322, the control unit 21 reads the anti-coincidence count data 23b (SIA) of the memory 23 in response to the command R and sends it to the control unit 28 through the input connecting line 12a.

In a step 323, the control unit 28 stores the anti-coincidence count data 23b (SIA) as anti-coincidence count data (SIB) 29b of the memory 29, and in a step 324, it checks whether the data SIB (=SIA) 29b has been counted down to zero or not.

If the anti-coincidence count data (SIB) 29b is zero, it means that the anti-coincidence of the entry of the secret number has occurred three times (NG2). Thus, in a step 3210, it is determined that the unauthorized use has been made and a command E is sent to the control unit 21 through the output connecting line 12b.

The command E commands the inhibition of the read/write of the apparatus A 11, and causes the sound generator 11e to generate an alarm sound or causes the display 14 to display an alarm message. The apparatus A 11 is subsequently disabled.

On the other hand, if the data (SIB) 29b in the memory 29 is not zero, the process proceeds from the NO port of the step 324 to a step 325 in which the control unit 28 sends a command S to the control unit 21 through the output connecting line 12b.

The command S commands to the control unit 21 to read the data of the memory 23, that is, the security code (SDA) 23a in a step 326 and send it to the control unit 28 through the input connecting line 12a.

When the control unit 28 receives the security code (SDA) 23a, it stores it in the temporary buffer 29c, and compares the data (SDA) with the security code (SDB) 29a in the memory 29 in a step 327.

If the security code (SDA) 23a and the security code (SDB) 29b are equal (OK) in the comparison, the process proceeds from the YES port of the step 327 to a step 328 in which a command 0 is sent to the control unit 21 through the output connecting line 12b of the control unit 28 so that the control unit 21 resets the anti-coincidence count data (SIA) 23b to "3", this process proceeds in step 329.

If the security code (SDA) 23a and the security code (SDB) 29a are not equal in the comparison of the step 327, the process branches from the NO port of the step 327 to a step 3211.

In the step 3211, if the security code (SDA) 23a is equal to the predetermined common number data (SDP), the process proceeds from the YES port of the step 3211 to a step 3212 in which the control unit 28 sends a command P to the control unit 21 through the output connecting line 12b.

When the control unit 21 receives the command P, it receives the data of the security code (SDB) 29a following to the command P and replaces the security code (SDA) 23a in the memory 23 by the security code (SDB) 29a. The registration of the secret number by the apparatus B 13 to the apparatus A 11 having the common number has thus been described. The subsequent operation is identical to that when the secret numbers are equal.

In the step 3211, if the security code (SDA) 23a is not equal to the predetermined common number data (SDP), the process branches from the NO port of the step 3211 to a step 3214 in which the anti-coincidence count data (SIB) is decremented by one and a command C is sent from the control unit 28 to the control unit 21 through the output connecting line 12b, in a step 3215.

The command C means that the anti-coincidence of the input secret number is less than three times. In a step 3216, the control unit 21 replaces the data of the anti-coincidence count data (SIB) 29b sent from the control unit 28 to the control unit 21 following to the command C by the anti-coincidence count data (SIB) 23b (SIA=SIA−1), and waits for the reentry of the secret number.

The sub-routine process of the secret number discrimination step 32a of FIG. 4 has thus been described. If the decision of the secret number discrimination step 32a is OK, the process proceeds from the step 32a to a step 33.

In the step 33, the control unit 28 indirectly causes the control unit 21 to wait for a function command as to whether read or write the memory 23 excluding the security code 23a and the anti-coincidence count data 23b, which is the individual selection number in the IDROM 22, to the IDROM 22. When the read key selection of a step 34a or the write key selection in a step 34b is made, the secret number process of the step 32a is effected again in steps 32b and 32c.

Step 37 prevents reading or writing to or from apparatus A after the pass of the secret number discrimination of the authorized apparatus A 11. Namely, the apparatus can not be used by an unauthorized person.

After the pass of the recheck, the control unit 28 causes the control unit 21 to read in the step 35 or write in the step 36.

In the first embodiment, the three security codes, that is, the individual ID code, the common code and the unused ID code, are provided, and the security code is written into IDROM 22 of the synthe-pager by the apparatus B which is started by the entry of the user secret number, the user writes the secret number by using the apparatus B 13 after the user has got it by using the secret number which the user registers by himself and the IDROM data which is set at the shipment of the synthe-pager, and if the secret number is not equal to the preregistered secret number of the apparatus A 11 or the common number of the apparatus A 11, the subsequent rewriting of the secret member is disabled. Accordingly, the unauthorized use by other user is prevented and the authorized user can add a security function to the synthe-pager of his own.

What is claimed is:

1. A receiver device having an individual selective call function, said device comprising:
    receiver means, having a memory storing a secret number, for performing a selective receiving operation;
    data control means for reading and writing data from and to said memory of said receiver means; and
    communication means having serial circuits for inputting and outputting said data to and from said data control means and for placing said receiver means in mutual communication with a memory writer, wherein:
        said secret number is a number initially registered into said memory which is subsequently updatable by a user by writing with said data control means,
        said data control means is enabled to write a new secret number to said memory when (i) said secret number and a number entered into said memory writer are equal and said data control means is enabled to write a new secret number to said memory when (ii) said secret number and said number entered into said memory writer are not equal but said secret number equals said number initially registered into said memory, and otherwise said data control means is disabled when said secret number and said number entered into said memory writer are not equal and said secret number is not equal to said number initially registered into said memory.

2. A receiver device having an individual selective call function according to claim 1 wherein reading of at least some of said data in addition to said secret number of the memory in addition to writing of the new secret number are enabled when the secret number of the receiver means and the number entered into the memory writer are equal.

3. A receiver device having an individual selective call function according to claim 1 further comprising alarm means for generating an alarm when the secret number and the number entered into the memory writer are not equal.

4. A receiver device having an individual selective call function according to claim 1, wherein said memory writer includes input means for inputting said number entered into said memory writer and display means for displaying the operation of said memory writer.

5. A receiver having an individual selective call function according to claim 1 wherein the receiver means includes a receiving local oscillation frequency synthesizer for selectively receiving a plurality of frequencies.

6. A pager system comprising:
    (a) a receiver having an individual selective call function comprising:
        receiver means, having a memory storing a secret number, for performing a selective receiving operation,
        data control means for reading and writing data from and to said memory of said receiver means,
        first communication means having a first serial circuit for inputting and outputting said data to and from said data control means;
    (b) a memory writer comprising:
        input means for entering an input number,
        a control unit for receiving said input number,
        second communication means having a second serial circuit for inputting and outputting data to and from said control unit;
        said first and second communication means selectively placing said receiver and said memory writer in and out of mutual communication with each other;
    wherein:
        said secret number is a number initially registered into said memory and subsequently updatable by a user by writing with said data control means,
        when said receiver and said memory writer are placed in mutual communication with each other, said receiver transmits said secret number, over said first and second communication means, to said memory writer and said control unit of said memory writer compares said secret number with said input number and (i) said control unit transmits, over said first and second communication means, an enablement signal for said data control means to write a new secret number to said memory when (1) said secret number and said input number are equal and an enablement signal for said data control means to write a new secret number to said memory when (2) said secret number is not equal to said input number but said secret number equals said number initially registered into said memory and (ii) otherwise said control unit transmits, over said first and second communication means, a disablement signal for said data control means when said secret number and said input number are not equal and said secret number is not equal to said number initially registered into said memory.

7. A pager system according to claim 6, wherein said memory of said receiver further stores an anti-coincidence count number, said control unit of said memory writer issues a signal, over said first and second communication means, to count down said anti-coincidence count number each time said input means enters an input number which is not equal to said secret number, and said control unit does not issue said disablement signal until said anti-coincidence count is equal to zero.

* * * * *